United States Patent [19]

Swanson

[11] 4,062,342
[45] Dec. 13, 1977

[54] ANTI POLLUTION INSERT

[76] Inventor: Bernard A. Swanson, 11805 SE. 54th Place, Bellevue, Wash. 98006

[21] Appl. No.: 659,488

[22] Filed: Feb. 19, 1976

[51] Int. Cl.² .............................................. A01G 13/06
[52] U.S. Cl. .................................... 126/59.5; 431/202
[58] Field of Search .............. 431/5, 202; 126/307 R, 126/307 A, 59.5, 85 R, 92 C; 110/8 A; 23/277 C

[56] References Cited

U.S. PATENT DOCUMENTS

| 2,448,656 | 9/1948 | Breese | 126/59.5 X |
| 2,672,333 | 3/1954 | Rocheville | 126/59.5 X |
| 3,073,684 | 1/1963 | Williams, Sr. | 23/277 C |
| 3,218,134 | 11/1965 | Walsh | 431/202 X |
| 3,857,671 | 12/1974 | Cox | 126/59.5 X |
| 3,930,803 | 1/1976 | Beasley et al. | 431/202 X |

FOREIGN PATENT DOCUMENTS

| 25,877 | 11/1968 | Japan | 431/202 |
| 1,367 of | 1886 | United Kingdom | 126/90 R |

Primary Examiner—William F. O'Dea
Assistant Examiner—Harold Joyce

[57] ABSTRACT

This insert device consists primarily of a flanged and perforated sleeve to which is secured, a plate with opening means for a flame produced by a fuel and air mixture, and the insert sleeve is secured to the inner periphery of a heater pipe or chimney. This device includes an optional ring, which can be used in heaters without forced air-feed, and the device is adaptable for orchard-space heaters and smoke-stacks.

3 Claims, 4 Drawing Figures

ANTI POLLUTION INSERT

This invention relates to heaters, and more particularly to an anti-pollution insert.

It is therefore the principal object of this invention to provide an anti-pollution insert, which will be adaptable for orchard space heaters, smoke-stacks or chimneys.

Another object of this invention is to provide an insert of the type described, which will employ the use of any type of pressurized fuel, such as, diesel oil, stove oil, kerosene, natural gas, propane or hydrogen.

A further object of this invention is to provide an insert of the type described, which, when the fuel under pressure is lighted at the nozzle, will form a vacuum, which will draw in air at the draft openings of the insert.

A still further object of this invention is to provide an insert of the type described, which may employ any powder or explosive that can be fired or ignited by a mechanical impact for starting a fire.

Other objects of the invention are to provide an anti-pollution insert, which is simple in design, inexpensive to manufacture, rugged in construction, easy to use and efficient in operation.

These and other objects will be readily evident upon a study of the following specification and the accompanying drawing, wherein.

Figure 1:
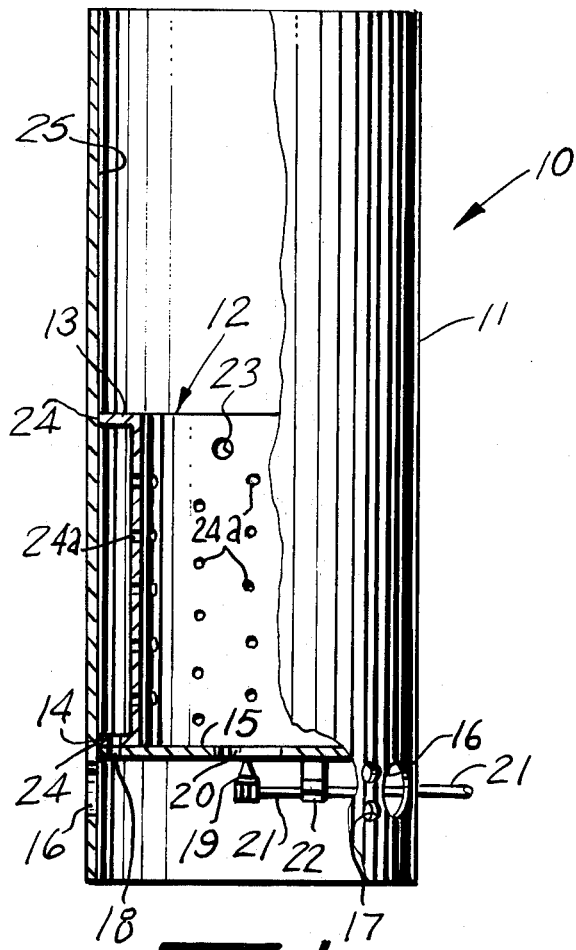
FIG. 1 is a vertical view of the present invention, shown partly broken away and secured within a heater pipe, which is shown in elevation.

According to this invention, air pollution insert 10 is shown installed within heated pipe 11, and it consists of the hollow sleeve 12, having an outwardly extending flange 13 at one end, and a similar flange 14 at the opposite end. Secured fixedly, in a suitable manner, to flange 14, is a plate 15 which will hereinafter be described.

Pipe 11 is provided with a plurality of spaced apart large openings 16 and a plurality of spaced apart smaller openings 17, which are spaced beneath plate 15 for serving as air inlet means. A plurality of openings 18 through plate 15, are in alignment with similar openings 18 of flange 14 for air inlet means into the interior of insert sleeve 12. A fuel nozzle 19 is positioned beneath the center of opening 20 of plate 15 for burning a suitable fuel. Nozzle 19 is secured to a horizontal fuel pipe 21 which is supported within bracket 22, secured fixedly to the bottom of plate 15, and pipe 21 extends out of one of the large openings 16 of pipe 11 to a fuel source. Sleeve 12 is provided with a plurality of large openings 23, near its upper extremity, and includes a plurality of smaller openings 24, which are spaced apart throughout the body of sleeve 12, each serving as draft inlet means for sleeve 12.

The outer peripheral edge of flange 13, and 14, is secured fixedly in a suitable manner to the inner peripheral surface 25 of pipe 11.

It shall be noted that the fuel being burned with the use of insert 10, will produce no smoke as does the designs of the prior art.

Figure 2:
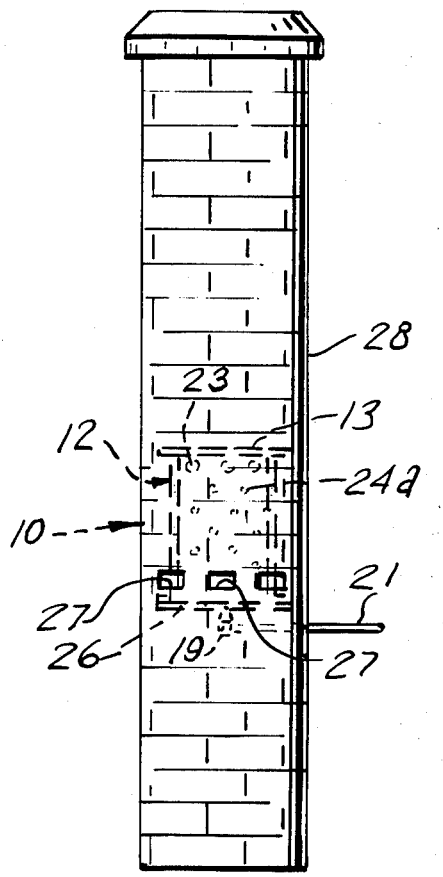
FIG. 2 is a vertical view of a large smoke-stack, shown in elevation with the invention shown installed therein.
Figure 3:
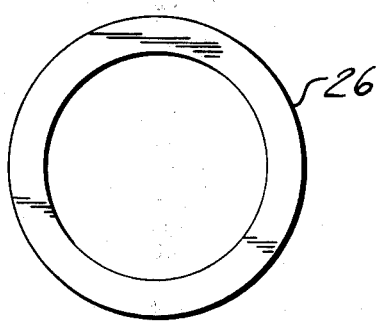
FIG. 3 is a plan view of a space collar, for use in large smoke-stacks or chimneys where forced air is used.

Referring now to FIGS. 2 and 3 of the drawing, insert 10 employs a spacer collar 26, which is secured in abutment with the lower end of insert 10 either replacing plate 15 and covering holes 18 in flange 14 or replacing flange 14 and plate 15 all together, and is spaced apart from the plurality of spaced apart openings 27 through the chimney 28 wall. Insert 10 as used in chimney 28, serves as a means for the burning up of smoke and other impurities. Thus smoke will travel upward straight through the collar 26 opening and hollow sleeve 12, while outside air will enter through chimney openings 27 and the sleeve openings 23 and 24 into the sleeve 12, mixing radially with the smoke.

Figure 4:
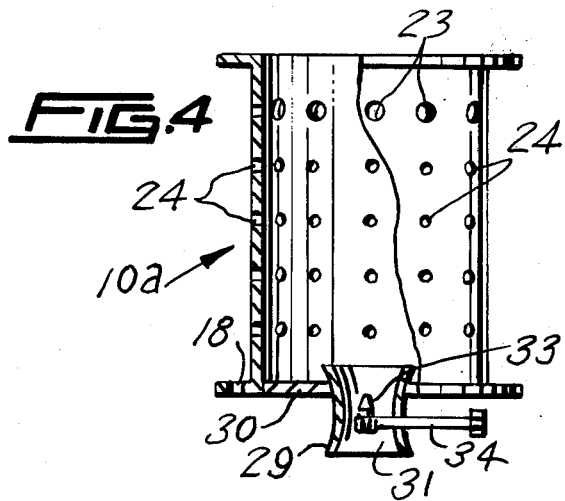
FIG. 4 is a vertical view of a modified form of the invention, shown in elevation, and partly broken away, the device employing a fixed venturi and fuel nozzle, the venturi throat serving to atomize the fuel for better or more complete combustion.

Referring now to the modified form, as shown in FIG. 4 of the drawing, sleeve 10a is similar to that heretofore described of insert 10, with the exception, that a venturi 29 is secured fixedly in a suitable manner, within the center of bottom wall 30, which is secured fixedly within the insert 10a. Within the throat 31 of venturi 29, is secured, nozzle 33 which is connected by fuel pipe 34 to a fuel source.

It shall be noted that the venturi 29 causes better atomization of the fuel air mixture, while simultaneously increasing air speed at the fuel nozzle 23, thus providing for more complete burning of the fuel.

What I now claim is:

1. An anti-pollution insert for heating pipes, chimney's or the like, comprising in combination,
   a. a sleeve member having at its upper circumference an upper outward extending round flange and at its bottom circumference a lower outward extending round flange,
   b. said sleeve member being secured within an associated heating pipe, having air apertures at its bottom portion, said upper outward extending flange mounted in airtight relationship to said heating pipe inner surface and said lower outward extending flange connected to said heating pipe inner surface at a location above said air apertures whereby said upper flange, said lower flange, said sleeve member exterior surface and said heating pipe interior surface form an annular shaped chamber,
   c. a plate means mounted to said sleeve bottom circumference and provided at its approximate center with a flame inlet opening which is in alignment with a thereunder mounted associated fuel nozzle means,
   d. said lower outward extending round flange provided with a plurality of air inlet openings so that air can enter said annular shaped chamber, and
   e. said sleeve member provided with a plurality of predetermined sized sleeve openings for conducting air from said annular chamber at evenly controlled flow radially inwards of said sleeve member thereby mixing with said associated flame and its inherent gasses and fuel particles so that a thorough combustion is obtained resulting in a smokeless heat output.

2. An anti-pollution insert for heating pipes, chimney's or the like as claimed in claim 1; wherein said predetermined sized sleeve openings comprise large size openings located adjacent said upper flange and smaller sized openings there below toward said lower flange so that an equal quantity of airflow is provided throughout said sleeve member vertical length in a radial inward direction for mixing with said associated flame.

3. An anti-pollution insert for heating pipes, chimney's or the like as claimed in claim 2; wherein said predetermined sized sleeve openings are positioned in annular staggered rows about the full length of said sleeve member between said upper and lower flanges.

* * * * *